(12) United States Patent
Liu et al.

(10) Patent No.: US 12,435,989 B2
(45) Date of Patent: Oct. 7, 2025

(54) SEMANTIC MAP AND POINT CLOUD MAP CONSTRUCTION METHOD, APPARATUS AND STORAGE MEDIUM

(71) Applicant: Beijing Tusen Zhitu Technology Co., Ltd., Beijing (CN)

(72) Inventors: Guangwei Liu, Beijing (CN); Ji Zhao, Beijing (CN)

(73) Assignee: Beijing Tusen Zhitu Technology Co., Ltd., Beijing (CN)

( * ) Notice: Subject to any disclaimer, the term of this patent is extended or adjusted under 35 U.S.C. 154(b) by 587 days.

(21) Appl. No.: 17/816,274

(22) Filed: Jul. 29, 2022

(65) Prior Publication Data
US 2023/0083965 A1    Mar. 16, 2023

(30) Foreign Application Priority Data
Jul. 30, 2021    (CN) .......................... 202110873182.3

(51) Int. Cl.
| | | |
|---|---|---|
| G01C 21/00 | (2006.01) | |
| G06T 7/11 | (2017.01) | |
| G06T 7/73 | (2017.01) | |

(52) U.S. Cl.
CPC ...... G01C 21/3811 (2020.08); G01C 21/3867 (2020.08); G06T 7/11 (2017.01);
(Continued)

(58) Field of Classification Search
CPC ............ G01C 21/3811; G01C 21/3867; G01C 21/3804; G06T 7/11; G06T 7/73;
(Continued)

(56) References Cited

U.S. PATENT DOCUMENTS

| | | | |
|---|---|---|---|
| 2020/0184727 A1* | 6/2020 | Ha | ......................... G06T 15/10 |
| 2021/0287430 A1* | 9/2021 | Li | ............................ G06T 7/74 |

(Continued)

FOREIGN PATENT DOCUMENTS

| | | |
|---|---|---|
| CN | 109887057 A | 6/2019 |
| CN | 109341706 B | 7/2020 |
| CN | 112258618 A | 5/2021 |

OTHER PUBLICATIONS

European Search Report from corresponding EP Application No. 22186622 dated, Jan. 2, 2023.

*Primary Examiner* — Mia M Thomas
(74) *Attorney, Agent, or Firm* — Perkins Coie LLP

(57) ABSTRACT

Embodiments of the present invention disclose a map construction method, apparatus, and storage medium. The method includes the following steps: acquiring sensor data collected by a preset sensor; establishing a pose constraint relationship of a movable object and a semantic constraint relationship of a semantic object according to the sensor data; performing a joint optimization solution according to the pose constraint relationship and the semantic constraint relationship to determine a semantic result of the semantic object and a pose result of the movable object; and constructing a semantic map and a point cloud map according to the semantic result and the pose result. By adopting the above technical solution, the semantic map and the point cloud map can be obtained quickly and accurately, thereby obtaining a more accurate high-definition map.

19 Claims, 6 Drawing Sheets

(52) U.S. Cl.
CPC ............... *G06T 7/73* (2017.01); *G06T 7/74* (2017.01); *G06T 2207/10028* (2013.01); *G06T 2207/30256* (2013.01)

(58) Field of Classification Search
CPC ............ G06T 7/74; G06T 2207/10028; G06T 2207/30256; G06V 10/762; G06V 20/56; G06V 20/588
See application file for complete search history.

(56) References Cited

U.S. PATENT DOCUMENTS

| | | | | |
|---|---|---|---|---|
| 2022/0194412 A1* | 6/2022 | Zhang | ................. | B60W 60/001 |
| 2022/0198813 A1* | 6/2022 | Chiu | ....................... | G06V 10/82 |
| 2022/0292711 A1* | 9/2022 | Pan | ........................... | G06T 7/38 |
| 2024/0181625 A1* | 6/2024 | Kumar | ................... | G06T 7/194 |
| 2024/0416963 A1* | 12/2024 | Li | .......................... | G06V 10/82 |
| 2024/0419902 A1* | 12/2024 | Wu | ........................ | G06F 40/30 |

\* cited by examiner

201 — Establishing a pose constraint relationship of a vehicle according to the sensor data collected by the preset sensor

202 — Performing semantic segmentation on the image collected by an image collection apparatus to obtain a 2D profile of a region where the semantic object is located

203 — Projecting a point cloud collected by a point cloud collection apparatus into the image, and determining a target 3D point corresponding to the semantic object according to the 2D profile

204 — Performing plane fitting or straight-line fitting on the target 3D point to obtain a corresponding space equation

205 — Determining 3D coordinates of the target 3D point according to pixel coordinates of the 2D profile, internal parameters of the image collection apparatus and external parameters between the image collection apparatus and the point cloud collection apparatus

206 — Fitting the target 3D point according to the space equation and the 3D coordinates of the target 3D point to obtain the observed value of the 3D profile corresponding to the semantic object

207 — Establishing, for each keyframe in a preset sliding window, an association between an observed value of the 3D profile in the current keyframe and a semantic object state variable set to update state variables of the semantic object in the semantic object state variable set; and establishing an error function corresponding to each 3D profile in the current keyframe

208 — Establishing a semantic constraint relationship according to the error functions corresponding to respective keyframes in the preset sliding window

209 — Constructing a joint optimization objective function corresponding to the respective keyframes in the preset sliding window according to the pose constraint relationship and the semantic constraint relationship

210 — Solving the joint optimization objective function to obtain estimated values of the respective state variables, wherein the estimated value of the state variable of the semantic object is recorded as the semantic result, and the estimated values of the position state variable and the attitude state variable are recorded as the pose result

211 — Constructing a semantic map and a point cloud map according to the semantic result and the pose result

*FIG. 2*

SEMANTIC MAP AND POINT CLOUD MAP CONSTRUCTION METHOD, APPARATUS AND STORAGE MEDIUM

CROSS-REFERENCE TO RELATED APPLICATION(S)

The present application claims priority to Chinese Patent Application No. 202110873182.3, titled "MAP CONSTRUCTION METHOD, APPARATUS AND DEVICE AND STORAGE MEDIUM," filed to China National Intellectual Property Administration on Jul. 30, 2021, the content of which is incorporated herein by reference in its entirety.

TECHNICAL FIELD

The embodiments of the present invention relate to the technical field of high-definition maps, and more particularly to a map construction method, apparatus, device, and a storage medium.

BACKGROUND

With the development of autonomous driving technologies and intelligent robot technologies, how to ensure the precise driving of autonomous vehicles and intelligent robots has become a hot issue. In the autonomous driving technologies, high-definition maps are generally used, the high-definition maps mainly including point cloud maps and semantic maps. The point cloud map may be a 3-dimension (3D) point cloud containing spatial position information, which is mainly used for registration-based online localization. The semantic map may be a map including road information such as lane lines, road poles or traffic lights, which can be used for online localization and path planning, etc., wherein traffic elements such as the lane lines, road poles or traffic lights may be referred to as semantic objects.

At present, there are two main methods for constructing high-definition point cloud maps and lane line maps: the first method includes: calculating a real-time pose using a high-precision integrated navigation device, then converting a point cloud scanned by lidar to a world coordinate system according to the obtained pose, accumulating data within a period of time or within a certain distance, and then manually drawing a semantic map according to different reflectivities of different objects in the point cloud map. The second method includes: performing pose estimation and sparse point cloud map construction by means of traditional vision-based simultaneous localization and mapping (SLAM), semantically segmenting a 2-dimension (2D) image to obtain points related to road information on this basis, and further constructing a semantic map.

However, in the existing schemes, the method of manually drawing the lane line is expensive and inefficient. In addition, the reflectivity of the point cloud is easily disturbed by external factors, such as road surface materials, humidity, and the installation height of lidar, etc. In real road scenes, it is difficult to accurately identify all road information through point cloud reflectivity. Besides, 2D information can be directly obtained by means of a vision method, but with low accuracy and a large error of the constructed semantic map. It can be seen that the existing high-definition map construction scheme is still not perfect and needs to be improved.

SUMMARY

The embodiments of the present invention provide a map construction method, apparatus and device, and a storage medium, which can optimize an existing high-definition map construction scheme.

In a first aspect, an embodiment of the present invention provides a map construction method. The method includes:
acquiring sensor data collected by a preset sensor;
establishing a pose constraint relationship of a movable object and a semantic constraint relationship of a semantic object according to the sensor data;
performing a joint optimization solution according to the pose constraint relationship and the semantic constraint relationship to determine a semantic result of the semantic object and a pose result of the movable object; and
constructing a semantic map and a point cloud map according to the semantic result and the pose result.

In a second aspect, an embodiment of the present invention provides a map construction apparatus. The apparatus includes:
a data acquisition module configured to acquire sensor data collected by a preset sensor;
a constraint relationship establishing module configured to establish a pose constraint relationship of a movable object and a semantic constraint relationship of a semantic object according to the sensor data;
a joint solution module configured to perform a joint optimization solution according to the pose constraint relationship and the semantic constraint relationship to determine a semantic result of the semantic object and a pose result of the movable object; and
a map construction module configured to construct a semantic map and a point cloud map according to the semantic result and the pose result.

In a third aspect, an embodiment of the present invention provides a computer device, which includes a memory, a processor, and a computer program that is stored in the memory and operable on the processor, wherein the processor is configured to implement the map construction method provided by the embodiment of the present invention when executing the computer program.

In a fourth aspect, an embodiment of the present invention further provides a computer-readable storage medium. The computer-readable storage medium stores a computer program therein, wherein the program, when being executed by a processor, implements the map construction method provided by the embodiment of the present invention.

According to the map construction scheme provided by the embodiments of the present invention, the pose constraint relationship of the movable object and the semantic constraint relationship of the semantic object are established according to the sensor data collected by the preset sensor, the joint optimization solution is performed according to the pose constraint relationship and the semantic constraint relationship to determine the semantic result and the pose result of the movable object, and the semantic map and the point cloud map are finally constructed according to the semantic result and the pose result. By adopting the above technical solution, a construction process of the semantic map and a construction process of the point cloud map are fused, and the joint solution is performed according to the pose constraint relationship and the semantic constraint relationship, such that the semantic result and the pose result can form a mutual constraint relationship, and the semantic map and the point cloud map can be obtained quickly and accurately, thereby obtaining a more accurate high-definition map and facilitating improving the autonomous movement performance of the movable object.

BRIEF DESCRIPTION OF THE DRAWINGS

FIG. 2 is a schematic flowchart of another map construction method provided by an embodiment of the present invention;

DETAILED DESCRIPTION

Figure 1:
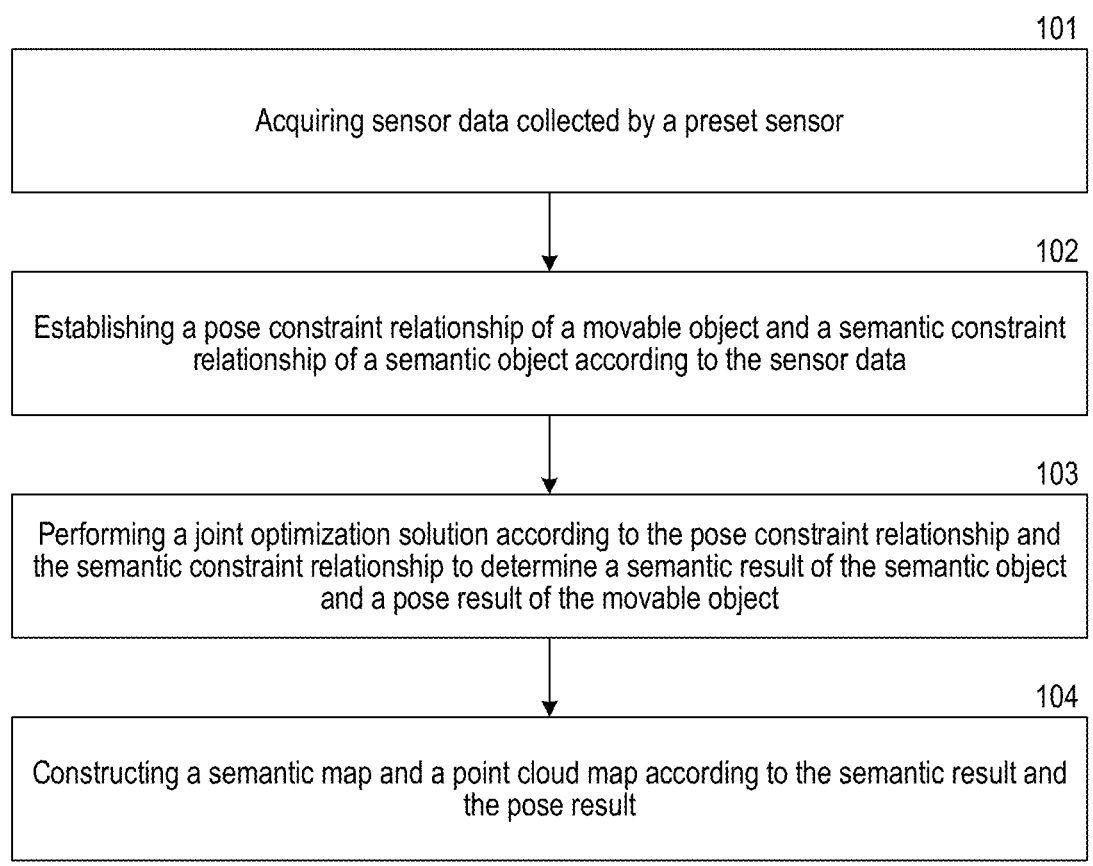
FIG. 1 is a schematic flowchart of a map construction method provided by an embodiment of the present invention.

The technical solutions in the embodiments of the present application will be described clearly and completely below in conjunction with accompanying drawings in the embodiments of the present application. Of course, the described embodiments are merely some embodiments, rather than all embodiments, of the present application. Based on the embodiments of the present application, all other embodiments derived by a person of ordinary skill in the art without creative efforts shall fall within the protection scope of the present application.

It should be noted that the terms "first," "second" and the like in the description and claims, as well as the above-mentioned drawings, of the present application are used to distinguish similar objects, but not necessarily used to describe a specific order or precedence order. It should be understood that data used in this way may be interchanged where appropriate so that the embodiments of the present application described herein can be implemented. Furthermore, the terms "including" and "having" and any variants thereof are intended to cover non-exclusive inclusions. For example, a process, method, system, product, or device that includes a series of steps or units is not necessarily limited to those steps or units that are clearly listed, but may include other steps or units that are not clearly listed or are inherent to such processes, methods, products, or devices.

In order to make a person of ordinary skill in the art better understand the present application, part of the technical terms that appear in the embodiments of the present application will be explained as follows.

Movable objects refer to objects that can be used for map collection, such as a vehicle, a mobile robot and an aircraft. Various types of sensors, such as lidar and a camera can be mounted on the movable objects.

Simultaneous localization and mapping means that, in an unknown environment, the movable objects localize themselves according to position estimation and maps, and at the same time incrementally construct maps according to their own localization.

Mapping refers to constructing a high-definition map describing a current scenario according to an estimated real-time pose of a vehicle or mobile robot and data collected by visual sensors such as lidar.

Pose refers to a general term for position and orientation, containing six degrees of freedom, including three position degrees of freedom and three orientation degrees of freedom. The three orientation degrees of freedom are usually represented by a pitch angle (Pitch), a roll angle (Roll) and a yaw angle (Yaw).

Frame refers to measurement data received by a sensor after completing one observation. For example, one frame of data from the camera is a picture, and one frame of data from the lidar is a set of laser point clouds.

Registration refers to matching observation results of the same region at different times and different positions to obtain a relative pose relationship between two observation times.

Nonlinear optimization refers to solving an optimization problem of a set of equations and inequalities consisting of a series of unknown real functions.

Keyframe refers to a keyframe which is generally created in the case of multi-sensor fusion using a nonlinear optimization method or other methods, in order to reduce the amount of system calculation, when a distance variation or attitude variation exceeds a certain threshold, and is generally optimized during the optimization process.

GNSS refers to a global navigation satellite system, which may include GPS or a Beidou positioning system, etc.

GPS refers to a global positioning system.

IMU refers to an inertial measurement unit, which is an apparatus that measures a three-axis attitude angle (or angular rate) and an acceleration of an object.

An integrated navigation device includes, for example, GNSS and IMU.

In some embodiments of the present application, the term "vehicle" is interpreted broadly to include any moving object including, for example, an aircraft, a watercraft, a spacecraft, an automobile, a truck, a van, a semi-trailer, a motorcycle, a golf cart, an off-road vehicle, a warehouse transport vehicle or agricultural vehicle, and means of transport on tracks, such as a tram or a train and other rail vehicles. The "vehicle" in the present application may generally include: a power system, a sensor system, a control system, a peripheral device, and a computer system. In some embodiments, the vehicle may include more, fewer, or different systems.

FIG. 1 is a schematic flowchart of a map construction method provided by an embodiment of the present invention. This method may be applied to an application scenario in which a high-definition map is constructed, and may be executed by a map construction apparatus, wherein this apparatus may be implemented in software and/or hardware, and may generally be integrated in a computer device. The computer device here may be integrated into the movable object, or may be externally connected to the movable object or communicated with the movable object. As shown in FIG. 1, the method includes the following steps 101-104.

In step 101, sensor data collected by a preset sensor is acquired.

Exemplarily, the preset sensor may be mounted on the movable object. The specific mounting method is not limited, and the present sensor may be integrated into the movable object or externally connected to the movable object, etc. The type of the preset sensor is not limited, and it can be any sensor used to establish a pose constraint relationship. For example, the preset sensor may include one or more of an integrated navigation unit (GNSS/IMU) INS, IMU, a wheel speedometer, an image collection apparatus, a point cloud collection apparatus, an accelerometer, and a gyroscope. Some sensors may also be integrated together, for example, IMU may include an accelerometer, a gyroscope and the like, and GNSS and IMU may be used as the integrated navigation device. In some embodiments, the image collection apparatus is, for example, a camera; and the point cloud collection apparatus is, for example, lidar, a millimeter-wave radar, an ultrasonic radar, or the like, but is of course not limited to this.

In step 102, a pose constraint relationship of a movable object and a semantic constraint relationship of a semantic object are established according to the sensor data.

In some embodiments, the pose constraint relationship of the movable object may be established according to sensor data collected by a first set of sensors, and the semantic constraint relationship of the semantic object may be established according to sensor data collected by a second set of sensors. The semantic object is a semantic object in an environment where the movable object is located. The pose constraint relationship includes pose-related state variables, and the semantic constraint relationship includes semantic-related state variables. The first set of sensors may include, for example, an integrated navigation device, a wheel speedometer, a laser collection apparatus, etc., and of course, may also include an image collection apparatus. The second set of sensors includes the image collection apparatus and the point cloud collection apparatus. According to the present disclosure, a 3D space representation of the semantic object is generated according to an image collected by the image collection apparatus and a point cloud collected by the laser collection apparatus, and a state quantity of the semantic object is obtained through joint optimization.

The specific type of the pose constraint relationship is not limited in the embodiments of the present application, which may be, for example, a global pose constraint relationship and a local consistency constraint relationship. The local consistency constraint relationship may include, for example, an IMU pre-integration constraint relationship, a speed constraint relationship, a point cloud registration constraint relationship, and the like. Different pose constraint relationships may be established according to different selections of preset sensors in the movable object, and the corresponding preset sensors may also be configured for the movable object according to a pose constraint relationship to be established. A corresponding error function may be established based on the sensor data as the pose constraint relationship when the pose constraint relationship is established. The state variables included in the error function and the specific expression form of the error function are not limited, and may be set according to the actual situation.

In a semantic map, there may be many types of semantic objects, such as lane lines, road poles, street signs, curbs, traffic lights, etc. In this embodiment of the present invention, the number of semantic objects involved in establishing a semantic constraint relationship may be one or more, which is not specifically limited. It should be noted that when there is a plurality of semantic objects, they may also contain semantic objects of the same type. For example, the semantic object type is a lane line, and a plurality of lane lines may be involved when the semantic constraint relationship is established.

When the semantic constraint relationship is established, 2D information in the image and 3D information in the point cloud may be effectively combined to improve the calculation accuracy of the 3D information of the semantic object, which is conducive to the constructing of a high-definition semantic map. The specific combination method may be set according to the actual situation. The corresponding error function may be established according to the 2D information and the 3D information as the semantic constraint relationship. The state variables included in the error function and the specific expression form of the error function are not limited.

In step 103, a joint optimization solution is performed according to the pose constraint relationship and the semantic constraint relationship to determine a semantic result of the semantic object and a pose result of the movable object.

Exemplarily, a joint error function may be established according to the error function corresponding to the pose constraint relationship and the error function corresponding to the semantic constraint relationship. This joint error function is solved by a certain solution method to obtain estimated values of respective state variables. The estimated values of the semantic-related state variables among the estimated values are determined as the semantic result, and the estimated values of the pose-related state variables among the estimated values are determined as the pose result of the movable object.

In step 104, a semantic map and a point cloud map are established according to the semantic result and the pose result.

Exemplarily, the semantic result may be processed to obtain a 3D profile of the semantic object, and then the semantic map may be constructed according to the 3D profile of the semantic object. The point clouds may be superimposed according to the pose result to obtain the point cloud map.

According to the map construction map provided by this embodiment of the present invention, the pose constraint relationship of the movable object and the semantic constraint relationship of the semantic object are established according to the sensor data collected by the preset sensor, the joint optimization solution is performed according to the pose constraint relationship and the semantic constraint relationship to determine the semantic result and the pose result of the movable object, and the semantic map and the point cloud map are finally constructed according to the semantic result and the pose result. By adopting the above technical solution, a construction process of the semantic map and a constructing process of the point cloud map are fused, and the joint solution is performed according to the pose constraint relationship and the semantic constraint relationship, such that the semantic result and the pose result can form a mutual constraint relationship, and the semantic map and the point cloud map can be obtained quickly and accurately, thereby obtaining a more accurate high-definition map and facilitating improving the autonomous movement performance of the movable object.

In some embodiments, the data collected by the sensor includes an image collected by the image collection apparatus and a point cloud collected by the point cloud collection apparatus; and the step of establishing the semantic constraint relationship according to the sensor data includes: determining an observed value of a 3D profile corresponding to each semantic object according to the image and the point cloud; and establishing the semantic constraint relationship based on the observed value of the 3D profile. Such setting has the following advantages: the semantic constraint relationship is established based on the observed value of the 3D profile of the semantic object, the 3D profile can better reflect space position relationships between the semantic objects and between the semantic objects and the movable object compared to the 2D profile, and the calculation accuracy of the 3D information of the semantic objects can be improved by combining the images with the point clouds.

In some embodiments, the step of determining the observed value of the 3D profile corresponding to each semantic object according to the image and the point cloud includes: performing semantic segmentation on the image to obtain a 2D profile of a region where the semantic object is located; projecting the point cloud into the image, and determining a target 3D point corresponding to the semantic object according to the 2D profile; and fitting the target 3D point to obtain the observed value of the 3D profile corresponding to the semantic object. Such setting has the following advantage: the observed value of the 3D profile may be obtained more accurately.

Semantic segmentation can be achieved by deep learning. Specifically, a relevant model can be trained according to the type of the semantic object in a targeted manner, and then the region where the semantic object is located in the image can be accurately segmented. Then, 3D points in the point cloud may be projected into the semantically segmented image through internal parameters of the image collection apparatus and external parameters between the image collection apparatus and the point cloud collection apparatus. Points in the 2D profile that fall within the region where the semantic object is located can be determined as target 3D points, and the target 3D points are fitted according to the characteristics of the 3D profile of the semantic object, the observed value of the 3D profile corresponding to the semantic object is obtained.

In some embodiments, the step of fitting the target 3D point to obtain the observed value of the 3D profile corresponding to the semantic object includes: performing plane fitting or straight-line fitting on the target 3D point to obtain a corresponding space equation; determining 3D coordinates of the target 3D point according to pixel coordinates of the 2D profile, internal parameters of the image collection apparatus and external parameters between the image collection apparatus and the point cloud collection apparatus; and fitting the target 3D point according to the space equation and the 3D coordinates of the target 3D point to obtain the observed value of the 3D profile corresponding to the semantic object. Such setting has the following advantage: the observed value of the 3D profile corresponding to the semantic object may be obtained more accurately.

Exemplarily, the semantic object may be abstracted into a corresponding 3D shape according to the characteristics of the 3D profile of the semantic object. For different semantic objects, different characterizing quantities may also be set to characterize the corresponding 3D profile. For example, a semantic object with larger surface area and smaller thickness may be abstracted into a plane figure, and a relative position or angle of this plane figure in space is characterized by a normal vector, etc., so as to obtain a space figure. Plane fitting may be performed in the case of fitting. A semantic object may be abstracted into a shape such as a cube if it has a larger thickness, and respective planes are then subjected to plane fitting, etc. For another example, a cylindrical semantic object may be abstracted as a cylinder, and may be subjected to straight-line fitting if it has a relatively small radius. In addition, it should be noted that the same semantic object may have a complex shape and can be disassembled, for example, divided into a cylinder and a plane image. At this time, different components of this semantic object can be fitted respectively to obtain corresponding space equations. 3D coordinates of the target 3D point may be determined according to the pixel coordinates of the 2D profile, the internal parameters of the image collection apparatus and the external parameters between the image collection apparatus and the point cloud collection apparatus. The observed value of the 3D profile corresponding to the semantic object is fitted by a preset analysis method in combination with a space equation and the 3D coordinates of the target 3D point, wherein the preset analysis method may be, for example, a principal component analysis (PCA) method.

A lane line is one of the most common semantic objects in a semantic map. In some embodiments, the semantic object includes a lane line. A 3D profile corresponding to the lane line includes a space rectangle (also referred to as a 3D rectangle); a characterizing quantity of the space rectangle includes at least one of a center point, a normal vector, a long side vector, a length and a width; and a fitting mode corresponding to a target 3D point corresponding to the lane line is plane fitting, so as to obtain a corresponding space plane equation. Each dashed lane line corresponds to one space rectangle, and each solid lane line corresponds to a plurality of space rectangles according to its length and curvature. Such setting has the following advantage: a 3D profile of the lane line may be accurately characterized. The dashed lane line is generally composed of a plurality of segments, wherein a geometry of each dashed lane line may be approximated as a rectangle; and each dashed line segment may be represented by one space rectangle. The solid lane line is generally long, and a road often has a certain curvature. In order to ensure the mapping accuracy, the long solid line may be divided into a plurality of short line segments according to its length and curvature. That is, the solid line is represented by a plurality of continuous space rectangles. A plurality of line segments is fitted respectively so as to obtain geometric information of the plurality of continuous space rectangles.

Road poles (which may include light poles or other pole-like road signs) are one of the most common road signs in semantic maps in highway scenarios. The positioning accuracy can be effectively improved by matching and positioning an observed road pole with a prior map. In some embodiments, the semantic object includes a road pole. A 3D profile corresponding to the road pole includes a cylinder; a characterizing quantity of the cylinder includes at least one of a top center point, a bottom center point and a radius; and a fitting mode corresponding to the target 3D point corresponding to the road pole is straight-line fitting, so as to obtain a corresponding space straight-line equation. Such setting has the following advantage: a 3D profile of the road pole may be accurately characterized.

In some embodiments, the step of establishing the semantic constraint relationship based on the observed value of the 3D profile includes: establishing, for each keyframe in a preset sliding window, an association between an observed value of a 3D profile in the current keyframe and a semantic object state variable set to update state variables of the semantic object in the semantic object state variable set, and establishing an error function corresponding to each 3D profile in the current keyframe; and establishing a semantic constraint relationship according to the error functions respectively corresponding to respective keyframes in the preset sliding window. Such setting has the following advantage: the mapping accuracy can be effectively improved by fusing the respective keyframes in the preset sliding window.

Exemplarily, the size of the preset sliding window can be preset according to the actual situation or dynamically set according to a preset rule. The preset sliding window generally contains a plurality of keyframes. A dynamically updated semantic object state variable set can be maintained, a 3D profile obtained by fitting each keyframe in the preset sliding window may be associated with the semantic object state variable set, and then the error function corresponding to each 3D profile is established; and the semantic constraint relationship may be obtained by integrating these error functions.

In some embodiments, the step of establishing, for the lane line, the association between the observed value of the 3D profile in the current keyframe and the semantic object state variable set to update the state variables of the semantic object in the semantic object state variable set includes: calculating, for each space rectangle in the current keyframe, a first distance between an observed value of a center point of the current space rectangle and a center point of each rectangle state variable in a lane line state variable set under the same coordinate system, wherein the current space rectangle is associated with the corresponding rectangle state variable if there is the first distance smaller than a first preset distance threshold; and the rectangle state variable corresponding to the current space rectangle is created in the lane line state variable set if the first distance is absent. Such setting has the following advantages: data of the same lane line rectangle in different keyframes is associated accurately; when a new lane line rectangle appears with the movement of the movable object, corresponding rectangle state variables are created in the lane line state variable set in time, thereby ensuring an accurate dynamic update of the lane line state variable set. The first preset distance threshold may be set according to actual requirements.

In some embodiments, the step of establishing, for the road pole, the association between the observed value of the 3D profile in the current keyframe and the semantic object state variable set to update the state variables of the semantic object in the semantic object state variable set includes: calculating, for each cylinder in the current keyframe, a third distance between an observed value of a top center point of the current cylinder and a top center of each rectangle state variable in a road pole state variable set under the same coordinate system, and calculating a fourth distance between an observed value of a bottom center point of the current cylinder and a bottom center of each rectangle state variable in a road pole state variable set, wherein the current cylinder is associated with the corresponding cylinder state variable if it is simultaneously satisfied that the third distance is less than a second preset distance threshold and the fourth distance is less than a third preset distance threshold; and the cylinder state variable corresponding to the current cylinder is created in the road pole state variable set if the third distance and the fourth distance are absent. Such setting has the following advantages: data of the cylinder of the same road pole in different keyframes is associated accurately; when a new road pole cylinder appears with the movement of the movable object, corresponding cylinder state variables are created in the road pole state variable set in time, thereby ensuring an accurate dynamic update of the road pole state variable set. The second preset distance threshold and the third preset distance threshold may be set according to actual requirements.

In some embodiments, the error function in the current keyframe includes a lane line error function corresponding to the space rectangle and/or a road pole error function corresponding to the cylinder; and the lane line error function includes an error function of each dashed lane line and an error function of each solid lane line. Such setting has the following advantage: the types of the semantic objects in the semantic map can be enriched, thereby further improving the mapping accuracy.

In some embodiments, the error function of each dashed lane line includes: an error function of the observed value and the state variables of the center point, the normal vector, the long side vector, the length and the width, as well as an error function of the state variable of the normal vector and a unit vector, and an error function of the state variable of the long side vector and the unit vector. Such setting has the following advantage: the error function of the dashed lane line may be constructed more comprehensively from a plurality of dimensions, which is conducive to improving the mapping accuracy.

In some embodiments, the error function of each solid lane line includes: an error function of the observed value and the state variables of the normal vector, the long side vector and the width, a second distance from the state variable of the center point to an observed center line, as well as an error function of the state variable of the normal vector and the unit vector and an error function of the state variable of the long side vector and the unit vector. Such setting has the following advantage: an error function about the length can be omitted since the solid lane line is continuous, taking into account the comprehensiveness and construction speed of the error function of the solid lane line, which is conducive to improving the mapping accuracy and controlling the calculation amount of the joint solution.

In some embodiments, the error function of the road pole includes: the error function of the observed value and the state variables of the top center point, the bottom center point and the radius.

It should be noted that, when the error function corresponding to each of the above respective semantic objects is constructed, the state variable and the observed value can be converted to the same coordinate system first if they are not in the same coordinate system. The specific coordinate system to which they are converted can be set according to the actual situation, which can generally be consistent with the state variable, e.g., a world coordinate system.

In some embodiments, the step of establishing a global pose constraint relationship of the movable object according to the collected sensor data in the case that the pose constraint relationship includes the global pose constraint relationship includes: estimating a current pose at a current time according to a pose at a previous time and a pose variation corresponding to the previous time to the current time, wherein the pose variation is obtained by IMU integration; and establishing, if a difference between the estimated current pose and an observed pose value is less than a preset gap threshold, the global pose constraint relationship corresponding to the current time according to a state variable of the pose and the observed pose value; or discarding the global pose constraint relationship corresponding to the current time. Such setting has the following advantage: the global pose precision can be improved. Here, the collected sensor data may include sensor data collected by an integrated navigation device; and the observed pose value may be an observed pose value of the integrated navigation device, which may include sensor data collected by GNSS, and may also include sensor data collected by IMU. Of course, the collected sensor data may also be data collected by a single sensor, and the observed pose value may also include an observed pose value of a single sensor. The integrated navigation device is a commonly used sensor for mapping a movable object, and can provide a high-precision real-time global pose. However, factors such as occlusion or multi-path effects will have a certain impact on the positioning accuracy, and may even cause localization failure, while a wrong global position may seriously reduce the precision. In this embodiment of the present invention, the pose at the current time is estimated according to the pose at the previous time and a pose variation obtained by IMU integration. If a difference between the estimated pose and the pose observed by the integrated navigation device exceeds a set threshold, it is considered that the observation of the integrated navigation device at that time is inaccurate and then discarded, thereby avoiding an impact on the global pose precision.

In some embodiments, the step of performing the joint optimization solution according to the pose constraint relationship and the semantic constraint relationship to determine the semantic result of the semantic object and the pose result of the movable object includes: constructing a joint optimization objective function corresponding to the respective keyframes in the preset sliding window according to the pose constraint relationship and the semantic constraint relationship; and solving the joint optimization objective function to obtain estimated values of the respective state variables, wherein the estimated values of the state variables of the semantic object are recorded as the semantic result, and the estimated values of the position state variable and the attitude state variable are recorded as the pose result. Such setting has the following advantage: a data range for joint optimization can be determined reasonably by using the preset sliding window, taking into account the mapping accuracy and the mapping efficiency. In the present disclosure, the state variable set for joint optimization includes not only state quantities representing poses, but also state quantities representing semantic objects, so that the joint optimization of pose state quantities and semantic object state quantities is simultaneously implemented in the process of joint optimization. The specific solution method is not limited, and may be a nonlinear optimization solution method, such as Ceres-Solver.

In some embodiments, the step of constructing the semantic map and the point cloud map according to the semantic result and the pose result includes: calculating corner points of the semantic object according to the semantic result and a geometrical relationship; performing connection processing on the respective corner points to obtain the 3D profile of the semantic object; synthesizing the 3D profiles of the respective semantic objects to obtain a semantic map of the semantic objects; and superimposing the point clouds according to the pose result to obtain a point cloud map, wherein for the dashed lane line, the 3D profile corresponds to a sequential connection line of four corner points of the space rectangle; and for the solid lane line, the 3D profile corresponds to two edge lines obtained by sequentially connecting the corner points along a length direction in a spatial order. Such setting has the following advantage: the semantic map and the point cloud map can be constructed quickly and accurately by effectively using the semantic result and the pose result, and output to downstream modules for use.

In some embodiments, the semantic map and the point cloud map may also be fused and constructed into one map. For example, the semantic map is superimposed on the point cloud map to present the above semantic result, thereby improving the visualization effect and convenience of map presentation, and reducing the data volume.

In some embodiments, a point cloud registration constraint is obtained in the following ways: dividing, for the point cloud of the respective keyframes in the preset sliding window, respective points into line feature points and plane feature points according to curvature information of the points in the point cloud; superimposing, for each keyframe in the preset sliding window, a pose of the previous keyframe and an inter-frame pose variation obtained by IMU integration to obtain an initial registration pose corresponding to the current keyframe; performing nearest neighbor search for the line feature points and the plane feature points in a local map according to the initial registration pose respectively to obtain a corresponding nearest neighbor feature point set, wherein the local map includes the feature points of the respective keyframes in the preset sliding window; establishing a line error function and a plane error function respectively according to the corresponding nearest neighbor feature point set; and determining the point cloud registration constraint according to the respective line error functions and plane error functions in the preset sliding window. Such setting has the following advantages: the frame-to-local map registration method can improve the accuracy and efficiency of point cloud registration; and the registration may also be performed for the keyframes in the preset sliding window, may be associated with the establishment of the semantic constraint relationship and may cooperate with the subsequent joint optimization solution.

Optionally, prior to establishing the point cloud registration constraint, point cloud data can be preprocessed according to the characteristics of the point cloud collection apparatus. For example, the observation data of mechanical lidar may cause a motion distortion due to the movement of the movable object. For each frame of lidar data, motion compensation can be performed on the point cloud first.

In some embodiments, the step of establishing the line error function according to the corresponding nearest neighbor feature point set corresponding to the line feature points includes: performing straight-line fitting according to the nearest neighbor feature point set corresponding to the line feature points, and determining the line error function according to a distance from each line feature point to a corresponding fitting straight line. The step of establishing the plane error function according to the corresponding nearest neighbor feature point set corresponding to the plane feature points includes: performing plane fitting according to the nearest neighbor feature point set corresponding to the plane feature points, and determining the plane error function according to a distance from each plane feature point to a corresponding fitting plane. Such setting has the following advantage: the corresponding error function is accurately constructed according to the respective characteristics of the line feature points and plane feature points, thereby further improving the mapping accuracy.

Figure 3:
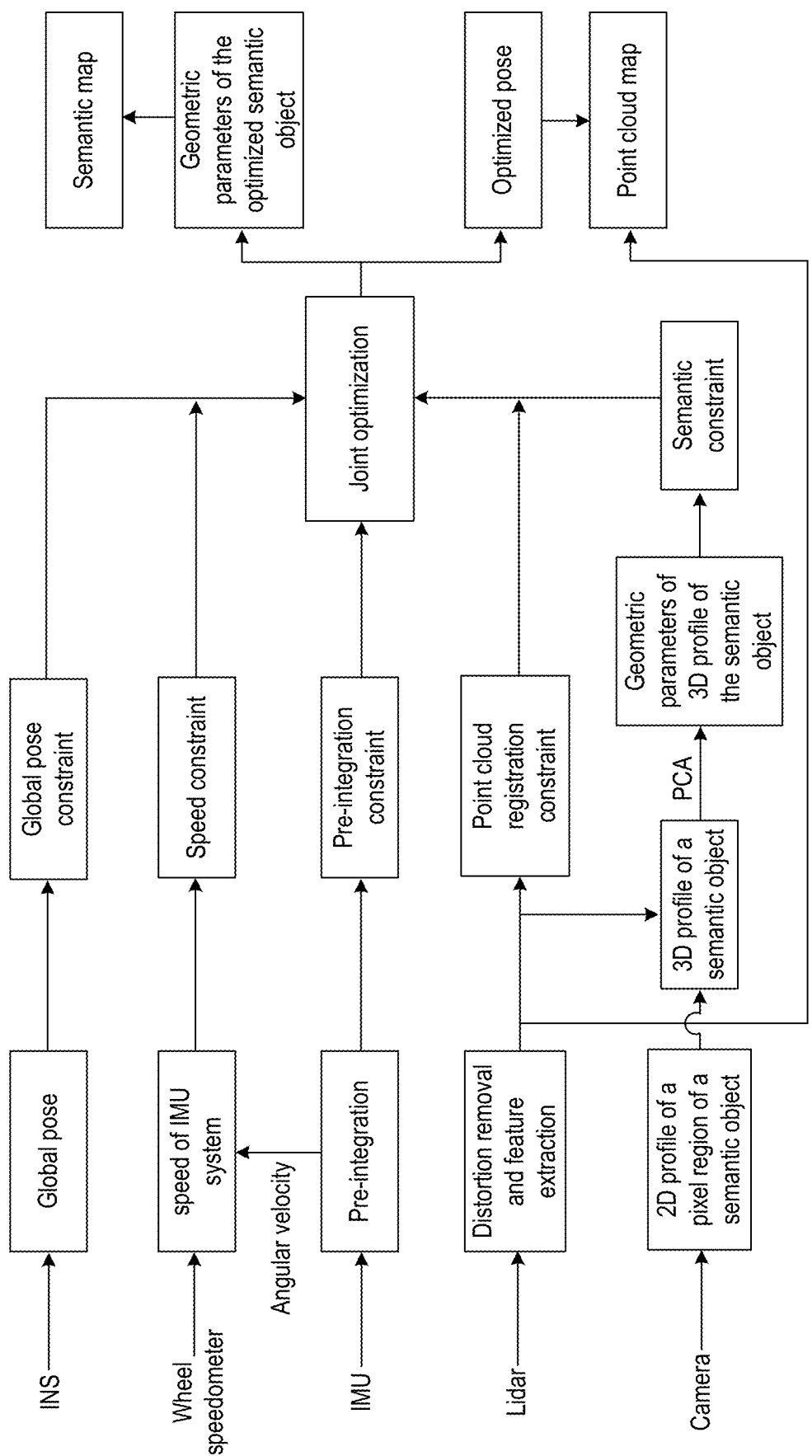
FIG. 3 is a schematic diagram of a principle of a map construction process provided by an embodiment of the present invention.

FIG. 2 is a schematic flowchart of another map construction method provided by an embodiment of the present invention; and FIG. 3 is a schematic diagram of a principle of a map construction process provided by an embodiment of the present invention. The embodiments of the present invention may be understood with reference to FIG. 2 and FIG. 3. For the convenience of description, the movable object being a vehicle may be taken as an example.

As shown in FIG. 2, this method may include the following steps 201-211.

In step 201, a pose constraint relationship of a vehicle is established according to sensor data collected by preset sensors.

In this embodiment of the present invention, the preset sensors may include an integrated navigation device (such as GNSS/IMU), an inertial measurement unit IMU, a wheel speed meter and lidar, wherein the IMU may include an accelerometer and a gyroscope, and the IMU may be integrated in the integrated navigation device. Since the observations of a plurality of preset sensors are fused, an IMU coordinate system (which may be denoted as I), a vehicle body coordinate system (which may be denoted as B), a lidar coordinate system (which may be denoted as L) and a world coordinate system (which may be denoted as W) may be involved. State variables to be optimized include an IMU position $P_I^W$, an attitude $R_I^W$, a velocity $v_I^W$, gyroscope zero bias $b_g$, accelerometer zero bias $b_a$, a geometric parameter $M^W$ of a lane line and a geometric parameter $N^W$ of a road pole in the world coordinate system. To simplify the description, $P_I^W, R_I^W, v_I^W, M^W$ and $N^W$ may be recorded briefly as P, R, v, M and N, wherein P, R and v may be collectively referred to as position state variables, M and N may be collectively referred to as pose state variables.

In this embodiment of the present invention, the pose constraint relationship includes a global pose constraint relationship, an IMU pre-integration constraint relationship, a velocity constraint relationship and a point cloud registration constraint relationship. The following is a schematic introduction to the establishment process of the respective pose constraint relationships.

(1) Global pose constraint relationship

The global pose constraint relationship may also be referred to as an absolute pose constraint relationship. A current pose at a current time is estimated according to a pose at a previous time and a pose variation corresponding to the previous time to the current time, wherein the pose variation is obtained by IMU integration; and if a difference between the estimated current pose and an observed pose value of the integrated navigation device is less than a preset difference threshold, the global pose constraint relationship corresponding to the current time is established according to a state variable of the pose and the observed pose value of the integrated navigation device; or the global pose constraint relationship corresponding to the current time is discarded.

The global pose constraint relationship may be expressed by the following expression:

$$r_I(R, P) = \begin{bmatrix} (R)^{-1} \cdot (\hat{P} - P) \\ \log[(R)^{-1} \cdot \hat{R}] \end{bmatrix}$$

wherein $r_I(R, P)$ represents the global pose constraint, which may be abbreviated as $r_I$; $\hat{P}$ represents an observed position value of the integrated navigation device in the world coordinate system; $\hat{R}$ represents an observed pose value of the integrated navigation device in the world coordinate system; and loge represents mapping from the Lie group to the Lie algebra.

(2) IMU pre-integration constraint relationship

IMU can be used to measure an angular velocity and acceleration in real time. By performing pre-integration, constraints on the position, attitude and velocity of the IMU can be obtained to increase the smoothness of the state estimation. The IMU pre-integration constraint is expressed by the following expression:

$$r_B(R, P, v, b_a, b_g) = \begin{bmatrix} R_t^{-1}\left(P_{t+1} - P_t - v_t \Delta t - \frac{1}{2}g\Delta t^2\right) - \Delta P_{t(t+1)} \\ R_t^{-1}(v_{t+1} - v_t - g\Delta t) - \Delta v_{t(t+1)} \\ \log(\Delta R_{t(t+1)}^{-1} R_t^{-1} R_{t+1}) \\ b_{a_{t+1}} - b_{a_t} \\ b_{g_{t+1}} - b_{g_t} \end{bmatrix}$$

wherein $r_B(R, P, v, b_a, b_g)$ represents an IMU pre-integration constraint, which may be abbreviated as $r_B$; t represents a time; g represents a gravitational acceleration; $\Delta t$ represents a time difference between a time t+1 and a time t; $\Delta P_t(t+1)$ represents a position variation from the time t to the time t+1; $\Delta R_{t(t+1)}^{-1}$ represents a reciprocal of an attitude variation from the time t to the time t+1; $\Delta v_{t(t+1)}$ represents a speed variation from the time t and the time t+1; and log ( ) represents mapping from the Lie group to the Lie algebra.

(3) Speed constraint relationship

The wheel speedometer can be used measure a running speed of a wheel in the world coordinate system:

$$\hat{v} = e_2^T \cdot v + n_v$$

wherein $\hat{v}$ represents an observed value of the wheel speedometer; v represents a speed state variable; $e_2^T$ is a 3×1 vector whose second term is 1 and the remaining terms are 0; and $n_v$ represents measurement noise of the wheel speedometer.

By integrating external parameters between the IMU coordinate system and the vehicle body coordinate system, a speed in the IMU coordinate system may be obtained as:

$$\hat{v}' = \hat{v} - \omega \cdot L_I^B$$

wherein ω represents an angular velocity measured by an IMU gyroscope; and $L_I^B$ is a lever arm value from the vehicle body coordinate system to the IMU coordinate system, which may be obtained through external parameter calibration.

In summary, an error function for speed may be established according to the observations of the wheel speedometer and the gyroscope:

$$r_v(v) = v - R\hat{v}'$$

wherein $r_v(v)$ represents the IMU pre-integration constraint, which may be abbreviated as $r_v$.

(4) Point cloud registration constraint relationship

An association between feature points and Local Map is established for each of respective keyframes in a preset sliding window (hereinafter referred to as a sliding window or slide-window) by using a k-dimensional tree (KD-Tree) algorithm; and a pose of each keyframe is used as an initial value of KD-Tree for nearest neighbor search. For the current frame, a pose of a previous keyframe and an inter-frame pose variation obtained by IMU integration is used to determine an initial value of point cloud registration; and then, a corresponding line error function and plane error function are established for each line feature point and plane feature point according to a nearest neighbor feature point set obtained by searching. That is, the line feature points and the plane feature points are subjected to nearest neighbor search in a local map by using the KD-Tree algorithm according to an initial registration pose respectively to obtain the corresponding nearest neighbor feature point set, and the line error function and the plane error function may be established respectively according to the corresponding nearest neighbor feature point set.

Any line feature point $x^{1'}$ may be subjected to straight-line fitting according to the nearest neighbor feature point set. A covariance matrix C of the nearest neighbor feature point set may be calculated to obtain a corresponding feature value V and a feature vector E. If a maximum value of the feature value is much larger than another two values, it can be considered that the straight-line fitting is successful, and a feature vector corresponding to the maximum feature value is a direction of this straight line. If the straight-line fitting is successful, the line error function, i.e., a distance from the feature point $x^l$ to the corresponding straight line may be determined according to a distance from the line feature point to the corresponding fitted straight line. The line error function is represented by the following expression:

$$r_{p2l}(R, P) = D \times (R \cdot R_L^I \cdot x^l + R \cdot P_L^I + P - M)$$

wherein $r_{p2l}$ represents the distance from the feature point $x^l$ to the corresponding straight line; D represents the direction of the fitted straight line; M represents a coordinate mean of the nearest neighbor feature point set; and $R_L^I$ and $P_L^I$ represent external parameters between the lidar coordinate system and the IMU coordinate system.

Any plane feature point $x^p$ may be subjected to plane fitting according to a nearest neighbor feature point set. Singular value decomposition (SVD) may be selected to fit a plane; and a plane equation of the fitted plane is expressed as $n^T x + d = 0$, wherein n represents a normal vector of the plane, and d is a corresponding coefficient. If the plane fitting is successful, a plane error function, i.e., a distance from the plane feature point $x^p$ to the plane, may be determined according to a distance from the plane feature point to the corresponding fitted plane. The plane error function may be represented by the following expression:

$$r_{p2p}(R, P) = n^T (R \cdot R_L^I \cdot x^p + R \cdot P_L^I + P) + d$$

wherein $r_{p2p}$ represents the distance from the plane feature point $x^p$ to the corresponding fitted plane; and $R_L^I$ and $P_L^I$ represent external parameters between the lidar coordinate system and the IMU coordinate system.

Correspondingly, the point cloud registration constraint is expressed by the following expression:

$$r_G(R, P) = \Sigma_{i=0}^{n_l} \|r_{p2}\|^2 + \Sigma_{i=0}^{n_p} \|r_{p2}^i\|_{\Sigma_{p2p}}^2$$

wherein $r_G(R, P)$ represents a point cloud registration constraint, which may be abbreviated as $r_G$; $n_l$ represents the number of line feature points included in the current keyframe; $n_p$ represents the number of plane feature points included in the current keyframe; and $\Sigma$ represents a preset registration information matrix.

In step 202, semantic segmentation is performed on an image collected by an image collection apparatus to obtain a 2D profile of a region where a semantic object is located.

In this embodiment of the present invention, the semantic object may include lane lines and/or road poles. For the convenience of description, the following is an example including both lane lines and road poles. Pixel regions corresponding to the lane lines and road poles may be detected from an image through a semantic segmentation method based on deep learning. Then, 3D information of the lane lines and road poles is calculated in combination with depth information provided by lidar. In order to facilitate data association and joint optimization of inter-frame semantic information, the lane lines and road poles may be parameterized with geometric figures.

For the lane line, a corresponding 3D profile includes a space rectangle; a characterizing quantity of the space rectangle includes at least one of a center point (C), a normal vector (N), a long side vector (T), a length (L) and a width (W); each dashed lane line corresponds to one space rectangle; and each solid lane line corresponds to a plurality of space rectangles according to its length and curvature.

Exemplarily, a pixel region belonging to the lane line is extracted from the image through semantic segmentation, and then a 2D profile of the lane line region may be further obtained through image processing.

For the road pole, a corresponding 3D profile includes a cylinder; and a characterizing quantity of the cylinder includes a top center point (also referred to as a starting point, denoted as S), a bottom center point (also referred to as an end point, denoted as E) and a radius (d).

Exemplarily, a pixel region belonging to the road pole is extracted from the image through semantic segmentation, and then a 2D profile of the road pole may be further obtained through image processing.

In step 203, a point cloud collected by a point cloud collection apparatus is projected into the image, and a target 3D point corresponding to the semantic object is determined according to the 2D profile.

Exemplarily, 3D points measured by the lidar can be projected to the image through internal parameters of a camera and external parameters between the camera and the lidar, and lidar points corresponding to the lane line and the road pole are obtained from the 2D profile.

In step 204, plane fitting or straight-line fitting is performed on the target 3D point to obtain a corresponding space equation.

For the lane line, since the corresponding region is generally located on one plane, the corresponding space plane equation can be obtained by performing plane fitting on the above-mentioned lidar points.

The space plane equation is represented by the following expression:

$$n_1 x + n_2 y + n_3 z + d = 0$$

wherein $n = (n_1 \ n_2 \ n_3)$ represents a unit normal vector; and d represents a distance from a coordinate origin in a coordinate system of the image collection apparatus to a space plane.

For the road pole, a straight-line equation corresponding to the road pole can be obtained by performing straight-line fitting on laser points belonging to the road pole; distances from the respective laser points belonging to the road pole to this straight line may be calculated; a mean value of these distances may be taken as the radius d of the road pole; and this straight line may be represented by a direction vector $m = (m_1 \ m_2 \ m_3)$ and a point $p = (P_1 \ P_2 \ P_3)$ on the road pole.

In step 205, 3D coordinates of the target 3D point are determined according to pixel coordinates of the 2D profile, internal parameters of the image collection apparatus and external parameters between the image collection apparatus and the point cloud collection apparatus.

For the lane line, 3D point coordinates corresponding to the 2D profile may be known according to a geometric relationship. That is, the 3D coordinates of the target 3D point are expressed by the following expression:

$$\begin{pmatrix} x \\ y \\ z \end{pmatrix} = -\frac{d}{H} \begin{pmatrix} f_y(u - c_x) \\ f_x(v - c_y) \\ f_x f_y \end{pmatrix}$$

wherein u and v represent pixel coordinates of a point in the 2D profile; and $f_x$, $f_y$, $c_x$ and $c_y$ represents internal parameters of the camera, $H = n_1 f_y(u - c_x) + n_2 f_x(v - c_y) + n_3 f_x f_y$.

For the road pole, since pixel coordinates and a straight-line equation of two endpoints of the road pole are known, 3D coordinates of two endpoints S and E may be obtained according to a geometric relationship. That is, the 3D coordinates of the target 3D point are expressed by the following expression:

$$\begin{pmatrix} x \\ y \\ z \end{pmatrix} = \frac{f_x(m_1 p_3 - m_3 p_1)}{f_x m_1 - m_3(u - c_x)} \begin{pmatrix} \frac{u - c_x}{f_x} \\ \frac{v - c_y}{f_y} \\ 1 \end{pmatrix}$$

wherein u and v represent pixel coordinates of the two endpoints; and $f_x$, $f_y$, $c_x$ and $c_y$ represent internal parameters of the camera.

In step 206, the target 3D point is fitted according to the space equation and the 3D coordinates of the target 3D point to obtain the observed value of the 3D profile corresponding to the semantic object.

For the lane line, a PCA method may be used to fit a 3D point set corresponding to a profile of the lane line to obtain a center point, a normal vector, a long side vector, a length and a width of a 3D rectangle. Similarly, for the road pole, the PCA method may be used to fit a 3D point set corresponding to the road pole to obtain a top center point, a bottom center point and a radius of a cylinder.

In step 207, an association between an observed value of a 3D profile in the current keyframe and a semantic object state variable set is established for each keyframe in a preset sliding window, to update state variables of the semantic object in the semantic object state variable set; and an error function corresponding to each 3D profile in the current keyframe is established.

For the lane line, in order to fuse all lane line observations in the sliding window to improve the mapping accuracy, a dynamically updated lane line state variable set M may be maintained. A lane line rectangle obtained by fitting each frame in the sliding window is associated with M, and an error function is established.

For the dashed space rectangle, an association between the observations and M may be established according to coordinates of the center point. Firstly, the coordinates of the center point are transformed according to a global pose of a current frame to obtain the coordinates of the center point of the rectangle in the world coordinate system. If the corresponding state variable can be found within a certain threshold range, the association is considered to be successful, and an error function is established; and if the corresponding state variable cannot be found, a new state variable is created and an error function is established.

The error function of the dashed lane line is represented by the following expression:

$$r_d(R, P, M) = \begin{bmatrix} (R^W)^{-1} \cdot (C^W - P^W) - C^I \\ (R^W)^{-1} \cdot N^W \times N^I \\ (R^W)^{-1} \cdot T^W \times T^I \\ L^W - L^I \\ W^W - W^I \\ (N^W)^T \cdot N^W - 1 \\ (T^W)^T \cdot T^W - 1 \end{bmatrix}$$

wherein $r_d(R, P, M)$ represents the error function of the dashed lane line, which may be abbreviated as $r_d$; P represents a position of the current keyframe in the world coordinate system; R represents a pose of the current keyframe in the world coordinate system; M represents a state variable of the space rectangle; C represents the center point; N represents the normal vector; T represents the long side vector; W represents the length; W represents the width; a superscript W represents the world coordinate system, corresponding to the state variable; and a superscript I represents an inertial navigation coordinate system, corresponding an observed value.

For the solid space rectangle, an association method may be similar to the dashed space rectangle. That is, an association between the observation and M may be established according to coordinates of the center point. Firstly, the coordinates of the center point are transformed according to a global pose of a current frame to obtain the coordinates of the center point of the rectangle in the world coordinate system. If the corresponding state variable can be found within a certain threshold range, the association is considered to be successful, and an error function is established; and if the corresponding state variable cannot be found, a new state variable is created and an error function is established.

Since the solid line is continuous and there is no strict corresponding relationship between the state variables and the fitting results of respective frames, it is necessary to establish the distances from the center point of the state variable to respective observed center lines, without the need to optimize the length of the rectangle. The error function of the solid lane line is represented by the following expression:

$$r_s(R, P, M) = \begin{bmatrix} T^W \times [(R^W)^{-1} \cdot (C^W - P^W) - C^I] \\ (R^W)^{-1} \cdot N^W \times N^I \\ (R^W)^{-1} \cdot T^W \times T^I \\ W^W - W^I \\ (N^W)^T \cdot N^W - 1 \\ (T^W)^T \cdot T^W - 1 \end{bmatrix}$$

wherein $r_s(R, P, M)$ represents the error function of the solid lane line, which may be abbreviated as $r_s$; P represents a position of the current keyframe in the world coordinate system; R represents a pose of the current keyframe in the world coordinate system; M represents a state variable of the space rectangle; C represents the center point; N represents the normal vector; T represents the long side vector; W represents the width; a superscript W represents the world coordinate system, corresponding to the state variable; and a superscript I represents an inertial navigation coordinate system, corresponding an observed value.

All the lane line fitting results may be synthesized in one frame to obtain a lane line error function corresponding to the space rectangle in the current keyframe, which may be expressed by the following expression:

$$r_L(R, P, M) = \Sigma_{i=0}^{n_d} \|r_d\|_{\Sigma_d}^2 + \Sigma_{i=0}^{n_s} \|r_s\|_{\Sigma_s}^2$$

wherein $r_L(R, P, M)$ represents the lane line error function corresponding to the space rectangle in the current keyframe, which may be abbreviated as $r_L$; $n_d$ represents the number of state variables of the space rectangle corresponding to the dashed lane line in the current keyframe; $n_s$ represents the number of state variables of the space rectangle corresponding to the solid lane line in the current keyframe; $\Sigma_d$ represents a preset dashed line information matrix; and $\Sigma_s$ represents a preset solid line information matrix.

For the road pole, in order to fuse all road pole observations in the sliding window to improve the mapping accuracy, a dynamically updated road pole state variable set N may be maintained. The road poles obtained by fitting each frame in the sliding window are associated with N, and an error function is established. The association between the observations and N may be established based on coordinates of two endpoints of the road pole. Firstly, the coordinates of the endpoints are transformed according to the global pose of the current frame to obtain the coordinates of the two endpoints in the world coordinate system. For the state variable set N, if a difference of distances between a state variable and two endpoints of the current road pole is less than a threshold, the association is considered to be successful, and an error function is established; and if the corresponding state variable cannot be found, a new state variable is created and an error function is established.

The error function of the road pole is represented by the following expression:

$$r_P(R, P, N) = \begin{bmatrix} (R_t^W)^{-1} \cdot (S^W - P_t^W) - S_t^I \\ (R_t^W)^{-1} \cdot (E^W - P_t^W) - E_t^I \\ d^W - d_t^I \end{bmatrix}$$

wherein $r_p(R, P, N)$ represents the error function of the dashed lane line, which may be abbreviated as $r_p$; P represents a position of the current keyframe in the world coordinate system; R represents a pose of the current keyframe in the world coordinate system; S represents the coordinates of the top center point of the cylinder; E represents the coordinates of the bottom center point of the cylinder; and d represents the radius of the cylinder.

All the road pole fitting results may be synthesized in one frame to obtain a road pole error function corresponding to the cylinder in the current keyframe, which may be expressed by the following expression:

$$r_P(R, P, N) = \Sigma_{i=0}^{n_P} \|r_p\|_{\Sigma_p}^2$$

wherein $r_P(R, P, N)$ represents the lane line error function corresponding to the space rectangle in the current keyframe, which may be abbreviated as $r_P$; $n_p$ represents the number of road poles included in the road pole fitting result in the current keyframe, that is, the number of cylinder state variables corresponding to the road poles; and $\Sigma_p$ is the preset road pole information matrix.

In step 208, a semantic constraint relationship is established according to the error functions corresponding to respective keyframes in the preset sliding window.

Exemplarily, the semantic constraint relationship may be expressed as:

$$\Sigma_{i=0}^{n_k}(\|r_L\|^2 + \|r_P\|^2)$$

wherein $n_k$ represents the number of keyframes in the present sliding window.

In step 209, a joint optimization objective function corresponding to the respective keyframes in the preset sliding window is established according to the pose constraint relationship and the semantic constraint relationship.

A pre-integration constraint $r_B$, a velocity constraint $r_v$, an absolute pose constraint $r_I$, a point cloud registration constraint $r_G$, a lane line constraint $r_L$ and a road pole constraint $r_P$ of each of the respective frames in the sliding window may be synthesized to construct the following joint optimization objective function:

$$\min_X \left\{ \sum_{k=1}^{n_k} \|r_B\|_{\Sigma_B}^2 + \sum_{k=0}^{n_k} \left( \|r_V\|_{\Sigma_V}^2 + \|r_I\|_{\Sigma_I}^2 + \|r_G\|^2 + \|r_L\|^2 + \|r_P\|^2 \right) \right\}$$

wherein $X = \{R, P, v, b_a, b_g, M\}$, $n_k$ represents the number of keyframes in the present sliding window; and $\Sigma$ represents the preset information matrix.

In step 210, the joint optimization objective function is solved to obtain estimated values of the respective state variables, wherein the estimated value of the state variable of the semantic object is recorded as the semantic result, and the estimated values of the position state variable and the attitude state variable are recorded as the pose result.

Exemplarily, the above joint optimization objective function may be solved by using Ceres-Solver to obtain the estimated values of the respective state variables.

In step 211, a semantic map and a point cloud map are constructed according to the semantic result and the pose result.

Exemplarily, for the lane line, four corner points of the space rectangle may be calculated based on a geometric relationship according to the semantic result; the respective corner points are subjected to connection processing to obtain the 3D profile of the lane line; and the 3D profiles of all lane lines are synthesized to obtain the semantic map of the lane lines. For the dashed lane line, the 3D profile corresponds to a sequential connection line of four corner points of the space rectangle; and for the solid lane line, the 3D profile corresponds to two edge lines obtained by sequentially connecting the corner points along a length direction in a spatial order.

Exemplary, for the road pole, the top center point and the bottom center point may be determined based on the geometric relationship according to the semantic result; the 3D profile of each road pole may be established according to the radius; and the 3D profiles of all road poles are synthesized to obtain the semantic map of the road poles.

For the point cloud map, the optimized pose may be used to stack motion-compensated point clouds to obtain a dense point cloud map.

According to this embodiment of the present invention which adopts the above technical solutions, global constraints and local consistency constraints on a system state are established through the fusion modeling of observation data from an integrated navigation device, a wheel speedometer, a camera and lidar, which effectively improves the precision and robustness of pose estimation, and enables normal mapping in tunnels, sea-crossing bridges and other scenarios; pixel regions belonging to lane lines and road poles can be effectively detected through an image-based semantic segmentation technology; then, the 3D information of the lane lines and road poles is calculated in combination with 3D observations of the lidar; and the lane line observations and road pole observations at different times are subjected to joint optimization by using time series information, which improves the precision and consistency of the semantic map.

Figure 4:
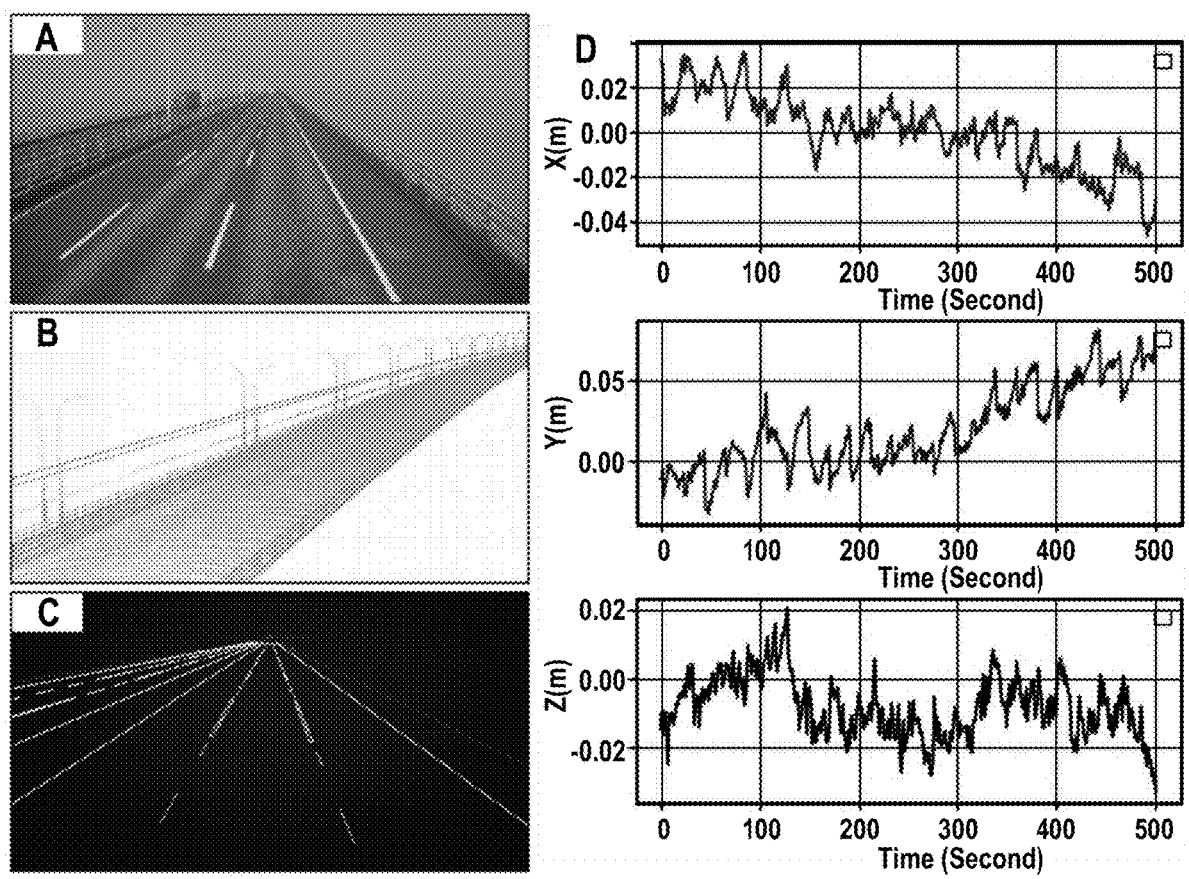
FIG. 4 is a schematic flowchart of a map construction result in a large bridge scenario provided by an embodiment of the present invention.
Figure 5:
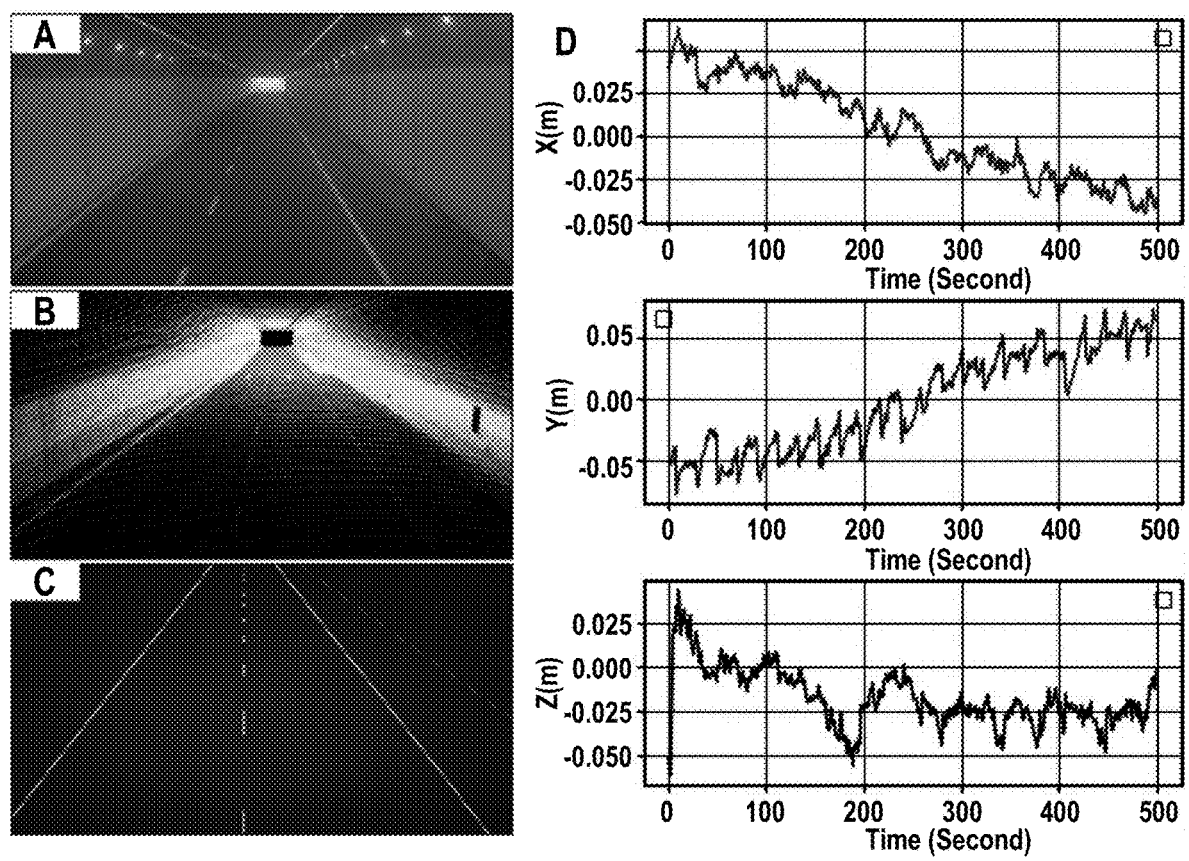
FIG. 5 is a schematic flowchart of a map construction result in a tunnel scenario provided by an embodiment of the present invention.

In order to verify the effectiveness of the technical solutions of the embodiments of the present invention, a data collection vehicle equipped with sensors such as GNSS, IMU, a wheel speedometer, a camera and lidar is used to collect road data under various complex road conditions for experimental verification. FIG. 4 is a schematic diagram of a map construction result in a large bridge scenario provided by an embodiment of the present invention, wherein a plot A is a large bridge scenario map, a plot B is a constructed point cloud map, a plot C is a schematic diagram of the constructed semantic map, and a plot D is a graph of a difference between an optimized position (X, Y and Z respectively represent three coordinate components in the space coordinate system) and a true value. FIG. 5 is a schematic diagram of a map construction result in a tunnel scenario provided by an embodiment of the present invention, wherein a plot A is a tunnel scenario map, a plot B is a constructed point cloud map, a plot C is a schematic diagram of the constructed semantic map, and a plot D is a graph of a difference between an optimized position (X, Y and Z respectively represent three coordinate components in the space coordinate system) and a true value. Relevant data in the large bridge scenario shown in FIG. 4 and relevant data in the tunnel scenario shown in FIG. 5 are collected by the collection vehicle. The technical solution provided by this embodiment of the present invention is used to construct a map, which is described by taking the semantic object being a lane line as an example. The collection vehicle is equipped with a high-precision commercial integrated navigation device, and a post-processing result thereof may be used as a true value of a pose. In order to verify the precision of the lane line map, spatial position coordinates (hereinafter referred to as absolute position points) of corner points of a part of the dashed lane line are measured by a surveying and mapping device. As can be seen from FIG. 4 and FIG. 5, in the technical solution provided by this embodiment of the present invention, a map may still be constructed under complex road conditions such as sea-crossing bridges and tunnels, and an error between the calculated position and the true value is within 10 cm. In addition, a difference between the coordinates of the corner points of the constructed lane line map and the absolute position point is also within 10 cm, which effectively ensures the mapping precision and accuracy.

Figure 6:
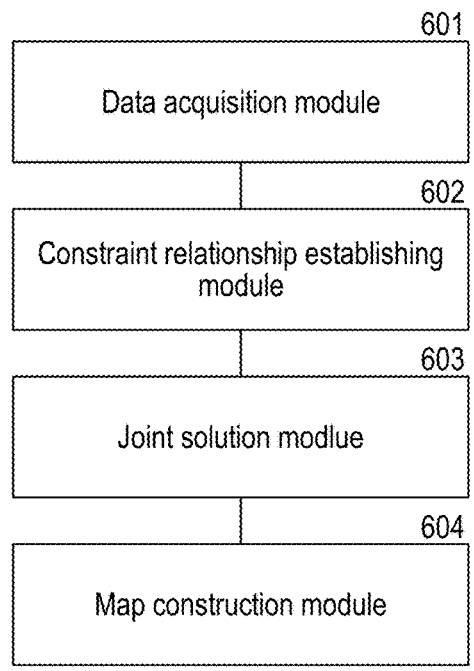
FIG. 6 is a schematic block diagram of a map construction apparatus provided by an embodiment of the present invention.

FIG. 6 is a structural block diagram of a map construction apparatus provided by an embodiment of the present invention. This apparatus may be implemented in software and/or hardware, and may generally be integrated in a computer device. A map may be constructed through the map construction method. As shown in FIG. 6, the apparatus includes:

a data acquisition module 601 configured to acquire sensor data collected by a preset sensor;

a constraint relationship establishing module 602 configured to establish a pose constraint relationship of a movable object and a semantic constraint relationship of a semantic object according to the sensor data;

a joint optimization solution 603 configured to perform a joint optimization solution according to the pose constraint relationship and the semantic constraint relationship to determine a semantic result of the semantic object and a pose result of the movable object; and a map construction module 604 configured to construct a semantic map and a point cloud map according to the semantic result and the pose result.

According to the map construction apparatus provided by this embodiment of the present invention, a construction process of the semantic map and a construction process of the point cloud map are fused, and the joint solution is performed according to the pose constraint relationship and the semantic constraint relationship, such that the semantic result and the pose result can form a mutual constraint relationship, and the semantic map and the point cloud map can be obtained quickly and accurately, thereby obtaining a more accurate high-definition map and facilitating improving the autonomous movement performance of the movable object.

Optionally, the sensor data collected by the preset sensor includes an image collected by an image collection apparatus and a point cloud collected by a point cloud collection apparatus; and the constraint relationship establishing module is specifically configured to: determine an observed value of a 3D profile corresponding to each semantic object according to the images and the point clouds; and establish the semantic constraint relationship based on the observed value of the 3D profile.

Optionally, the step of determining the observed value of the 3D profile corresponding to the semantic object according to the image and the point cloud includes: performing semantic segmentation on the image to obtain a 2D profile of a region where the semantic object is located; projecting the point cloud into the image, and determining a target 3D point corresponding to the semantic object according to the 2D profile; and fitting the target 3D point to obtain the observed value of the 3D profile corresponding to the semantic object.

Optionally, the step of fitting the target 3D point to obtain the observed value of the 3D profile corresponding to the semantic object includes: performing plane fitting or straight-line fitting on the target 3D point to obtain a corresponding space equation; determining 3D coordinates of the target 3D point according to pixel coordinates of the 2D profile, internal parameters of the image collection apparatus and external parameters between the image collection apparatus and the point cloud collection apparatus; and fitting the target 3D point according to the space equation and the 3D coordinates of the target 3D point to obtain the observed value of the 3D profile corresponding to the semantic object.

Optionally, the semantic object includes a lane line. A 3D profile corresponding to the lane line includes a space rectangle; a characterizing quantity of the space rectangle includes at least one of a center point, a normal vector, a long side vector, a length and a width; and a fitting mode corresponding to the target 3D point corresponding to the lane line is plane fitting, so as to obtain a corresponding space plane equation, wherein each dashed lane line corresponds to one space rectangle, and each solid lane line corresponds to a plurality of space rectangles according to its length and curvature.

Optionally, the semantic object includes a road pole. A 3D profile corresponding to the road pole includes a cylinder; a characterizing quantity of the cylinder includes at least one of a top center point, a bottom center point and a radius; and a fitting mode corresponding to the target 3D point corresponding to the road pole is straight-line fitting, so as to obtain a corresponding space straight-line equation.

Optionally, the step of establishing the semantic constraint relationship based on the observed value of the 3D profile includes: establishing, for each keyframe in a preset sliding window, an association between an observed value of a 3D profile in the current keyframe and a semantic object state variable set to update state variables of the semantic object in the semantic object state variable set, and establishing an error function corresponding to each 3D profile in the current keyframe; and establishing a semantic constraint relationship according to the error functions corresponding to respective keyframes in the preset sliding window.

Optionally, the step of establishing, for the lane line, the association between the observed value of the 3D profile in the current keyframe and the semantic object state variable set to update the state variables of the semantic object in the semantic object state variable set includes: calculating, for each space rectangle in the current keyframe, a first distance between an observed value of a center point of the current space rectangle and a center point of each rectangle state variable in a lane line state variable set under the same coordinate system, wherein the current space rectangle is associated with the corresponding rectangle state variable if there is the first distance smaller than a first preset distance threshold; and the rectangle state variable corresponding to the current space rectangle is created in the lane line state variable set if the first distance is absent.

Optionally, the error function in the current keyframe includes a lane line error function corresponding to the space rectangle and/or a road pole error function corresponding to the cylinder; and the lane line error function includes an error function of each dashed lane line and an error function of each solid lane line.

Optionally, the error function of each dashed lane line includes: an error function of the observed value and the state variables of the center point, the normal vector, the long side vector, the length and the width, as well as an error function of the state variable of the normal vector and a unit vector, and an error function of the state variable of the long side vector and the unit vector.

Optionally, the error function of each solid lane line includes: an error function of the observed value and the state variables of the normal vector, the long side vector and the width, a second distance from the state variable of the center point to an observed center line, as well as an error function of the state variable of the normal vector and the unit vector and an error function of the state variable of the long side vector and the unit vector.

Optionally, the preset sensor includes one or more of GNSS, IMU, a wheel speedometer, the image collection apparatus and the point cloud collection apparatus, wherein the IMU includes an accelerator and a gyroscope, and GNSS may also form an integrated navigation device with IMU; and the pose constraint relationship includes one or more of the followings: a global pose constraint relationship, an IMU pre-integration constraint relationship, a velocity constraint relationship and a point cloud registration constraint relationship.

Optionally, a constraint relationship establishing module is specifically configured to: estimate a current pose at a current time according to a pose at a previous time and a pose variation corresponding to the previous time to the current time in the case that the pose constraint relationship includes the global pose constraint relationship, wherein the pose variation is obtained by IMU integration; and establishing, if a difference between the estimated current pose and an observed pose value is less than a preset gap threshold, the global pose constraint relationship corresponding to the current time according to a state variable of the pose and the observed pose value; or discarding the global pose constraint relationship corresponding to the current time.

Optionally, the joint solution module is specifically configured to: construct a joint optimization objective function corresponding to the respective keyframes in the preset sliding window according to the pose constraint relationship and the semantic constraint relationship; and solving the joint optimization objective function to obtain estimated values of the respective state variables, wherein the estimated value of the state variable of the semantic object is recorded as the semantic result, and the estimated values of the position state variable and the attitude state variable are recorded as the pose result.

Optionally, the map construction module is specifically configured to: calculate corner points of the semantic object according to the semantic result and a geometrical relationship; perform connection processing on the respective corner points to obtain the 3D profile of the semantic object; synthesize the 3D profiles of the respective semantic objects to obtain a semantic map of the semantic objects; and superimpose the point clouds according to the pose result to obtain a point cloud map, wherein for the dashed lane line, the 3D profile corresponds to a sequential connection line of four corner points of the space rectangle; and for the solid lane line, the 3D profile corresponds to two edge lines obtained by sequentially connecting the corner points along a length direction in a spatial order.

Optionally, a point cloud registration constraint is obtained in the following ways: dividing, for the point cloud of the respective keyframes in the preset sliding window, respective points into line feature points and plane feature points according to curvature information of the points in the point cloud; superimposing, for each keyframe in the preset sliding window, a pose of the previous keyframe and an inter-frame pose variation obtained by IMU integration to obtain an initial registration pose corresponding to the current keyframe; performing nearest neighbor search for the line feature points and the plane feature points in a local map according to the initial registration pose respectively to obtain a corresponding nearest neighbor feature point set, wherein the local map includes the feature points of the respective keyframes in the preset sliding window; establishing the line error function and the plane error function respectively according to the corresponding nearest neighbor feature point set; and determining the point cloud registration constraint according to the respective line error functions and plane error functions in the preset sliding window.

Optionally, the step of establishing the line error function according to the nearest neighbor feature point set corresponding to the line feature points includes: performing straight-line fitting according to the nearest neighbor feature point set corresponding to the line feature points, and determining the line error function according to a distance from each line feature point to a corresponding fitting straight line. The step of establishing the plane error function according to the nearest neighbor feature point set corresponding to the plane feature points includes: performing plane fitting according to the nearest neighbor feature point set corresponding to the plane feature points, and determining the plane error function according to a distance from each plane feature point to a corresponding fitting plane.

Figure 7:
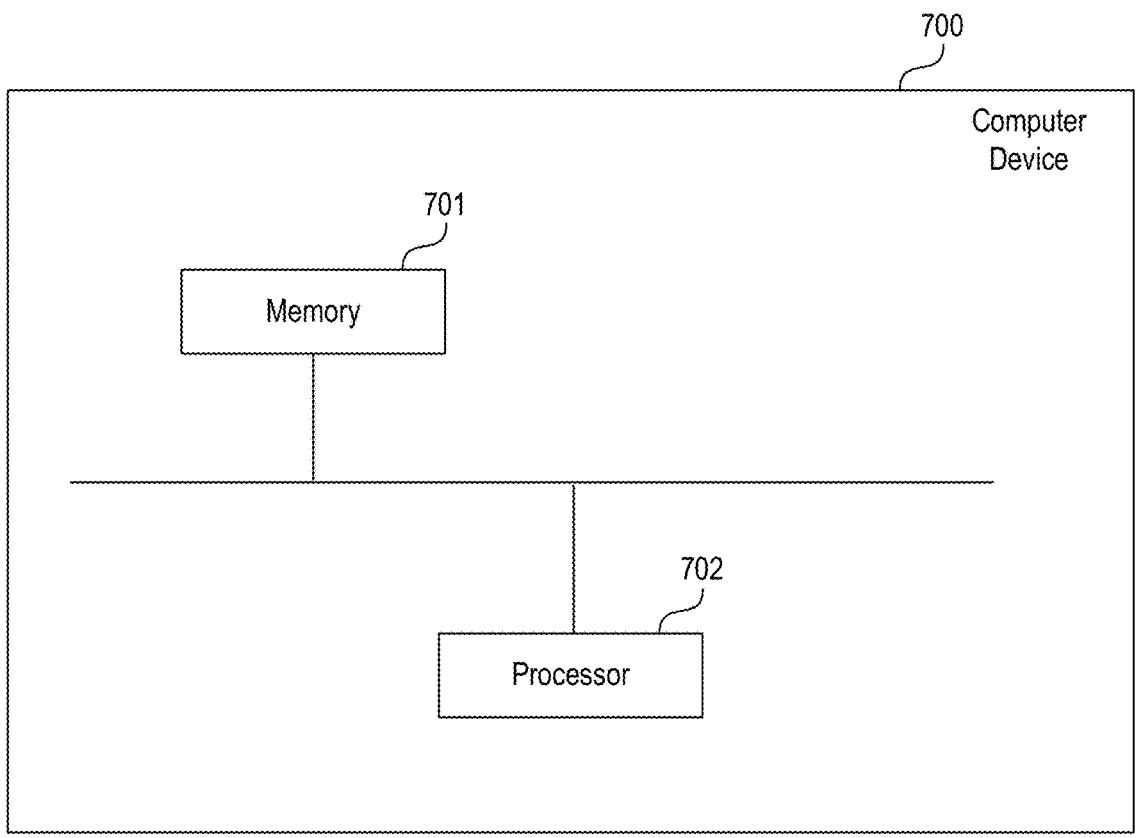
FIG. 7 is a structural block diagram of a computer device provided by an embodiment of the present invention.

An embodiment of the present invention provides a computer device. The map construction apparatus provided by the embodiment of the present invention may be integrated in the computer device. FIG. 7 is a structural block diagram of a computer device provided by an embodiment of the present invention. A computer device 700 may include a memory 701, a processor 702, and a computer program that is stored in the memory 701 and operable on the processor, wherein the processor 702 is configured to implement the map construction method provided by the embodiment of the present invention when executing the computer program. The computer device here may be integrated into a movable object, or may also be the movable object itself, e.g., a vehicle, or may be externally connected to the movable object or communicated with the movable object.

According to the computer device provided by this embodiment of the present invention, a construction process of the semantic map and a construction process of the point cloud map are fused, and the joint optimization solution is performed according to the pose constraint relationship and the semantic constraint relationship, such that the semantic result and the pose result can form a mutual constraint relationship, and the semantic map and the point cloud map can be obtained quickly and accurately, thereby obtaining a more accurate high-definition map and facilitating improving the autonomous movement performance of the movable object.

An embodiment of the present invention further provides a storage medium containing a computer-executable instruction, the computer-executable instruction being executed by a computer processor to execute the map construction method provided by the embodiment of the present invention.

The storage medium may be any of various types of memory devices or storage devices. The term "storage medium" is intended to include: an installation medium, such as CD-ROM, a floppy disk, or a cassette apparatus; a computer system memory or random access memory, such as DRAM, DDRRAM, SRAM, EDORAM, Rambus RAM, etc.; a non-volatile memory, such as a flash memory, a magnetic medium (e.g., a hard disk or an optical storage); a register or other similar types of memory components, etc. The storage medium may also include other types of memories or combinations thereof. In addition, the storage medium may be located in a first computer system in which a program is executed, or may be located in a second, different computer system, wherein the second computer system is connected to the first computer system through a network, such as Internet. The second computer system may provide program instructions to the first computer for execution. The term "storage medium" may include two or more storage media that may reside in different positions (e.g., in different computer systems connected by a network). The storage medium may store program instructions (e.g., specifically embodied as a computer program) executable by one or more processors.

The map construction apparatus and device as well as the storage medium provided by the embodiments can execute the map construction method provided by any embodiment of the present invention, and have corresponding functional modules for executing this method and beneficial effects. The technical details which are not described in detail in the foregoing embodiments may refer to the map construction method provided by any embodiment of the present invention.

It should be noted that the above descriptions are merely preferred embodiments of the present invention and the applied technical principles. Those skilled in the art will understand that the present invention is not limited to the specific embodiments described herein, and various obvious changes, readjustments and substitutions can be made by those skilled in the art without departing from the protection scope of the present invention. Therefore, although the present invention has been described in detail through the above embodiments, the present invention is not limited to the above embodiments, and can also include more other equivalent embodiments without departing from the concept of the present invention. The scope of the present invention is based on the scope of the appended claims.

What is claimed is:

1. A map construction method, comprising:
    acquiring sensor data collected by a preset sensor;
    establishing a pose constraint relationship of a movable object and a semantic constraint relationship of a semantic object according to the sensor data;
    performing a joint optimization solution according to the pose constraint relationship and the semantic constraint relationship to determine a semantic result of the semantic object and a pose result of the movable object; and
    constructing a semantic map and a point cloud map according to the semantic result and the pose result;
    wherein the sensor data comprises an image collected by an image collection apparatus and a point cloud collected by a point cloud collection apparatus, and the establishing the semantic constraint relationship of the semantic object according to the sensor data comprises:
    determining an observed value of a 3D profile corresponding to each semantic object according to the image and the point cloud; and
    establishing the semantic constraint relationship based on the observed value of the 3D profile.

2. The method according to claim 1, wherein the step of determining the observed value of the 3D profile corresponding to each semantic object according to the image and the point cloud comprises:
    performing semantic segmentation on the image to obtain a 2D profile of a region where the semantic object is located;
    projecting the point cloud into the image, and determining a target 3D point corresponding to the semantic object according to the 2D profile; and
    fitting the target 3D point to obtain the observed value of the 3D profile corresponding to the semantic object.

3. The method according to claim 2, wherein the step of fitting the target 3D point to obtain the observed value of the 3D profile corresponding to the semantic object comprises:
    performing plane fitting or straight-line fitting on the target 3D point to obtain a corresponding space equation;
    determining 3D coordinates of the target 3D point according to pixel coordinates of the 2D profile, internal parameters of the image collection apparatus and external parameters between the image collection apparatus and the point cloud collection apparatus; and
    fitting the target 3D point according to the space equation and the 3D coordinates of the target 3D point to obtain the observed value of the 3D profile corresponding to the semantic object.

4. The method according to claim 3, wherein the semantic object comprises a lane line; the 3D profile corresponding to the lane line comprises a space rectangle; a characterizing quantity of the space rectangle comprises at least one of a center point, a normal vector, a long side vector, a length and a width; a fitting mode corresponding to the target 3D point corresponding to the lane line is plane fitting, so as to obtain a corresponding space plane equation, wherein each dashed line corresponds to one space rectangle, and each solid lane line corresponds to a plurality of space rectangles according to its length and curvature.

5. The method according to claim 4, wherein the semantic object comprises a road pole; the 3D profile corresponding to the road pole comprises a cylinder; a characterizing quantity of the cylinder comprises at least one of a top center point, a bottom center point and a radius; and a fitting mode corresponding to the target 3D point corresponding to the road pole is straight-line fitting, so as to obtain a corresponding space straight-line equation.

6. The method according to claim 5, wherein the step of establishing the semantic constraint relationship based on the observed value of the 3D profile comprises:

establishing, for each current keyframe in a preset sliding window, an association between an observed value of the 3D profile in the current keyframe and a semantic object state variable set to update state variables of the semantic object in the semantic object state variable set; and establishing an error function corresponding to each 3D profile in the current keyframe; and establishing the semantic constraint relationship according to the error functions corresponding to respective keyframes in the preset sliding window.

7. The method according to claim 6, wherein the step of establishing, for the lane line, the association between the observed value of the 3D profile in the current keyframe and the semantic object state variable set to update the state variables of the semantic object in the semantic object state variable set comprises:

calculating, for each space rectangle in the current keyframe, a first distance between an observed value of a center point of the current space rectangle and a center point of each rectangle state variable in a lane line state variable set under a same coordinate system, wherein a current space rectangle is associated with a corresponding rectangle state variable if there is the first distance smaller than a first preset distance threshold; and the rectangle state variable corresponding to the current space rectangle is created in the lane line state variable set if the first distance is absent.

8. The method according to claim 6, wherein the error function in the current keyframe comprises a lane line error function corresponding to the space rectangle and/or a road pole error function corresponding to the cylinder; and the lane line error function comprises an error function of each dashed lane line and an error function of each solid lane line.

9. The method according to claim 6, wherein the error function of each dashed lane line comprises:

an error function of the observed value and the state variables of the center point, the normal vector, the long side vector, the length and the width, as well as an error function of the state variable of the normal vector and a unit vector, and an error function of the state variable of the long side vector and the unit vector.

10. The method according to claim 6, wherein the error function of each solid lane line comprises:

an error function of the observed value and the state variables of the normal vector, the long side vector and the width, a second distance from the state variable of the center point to an observed center line, as well as an error function of the state variable of the normal vector and a unit vector and an error function of the state variable of the long side vector and the unit vector.

11. A computer device comprising a memory, at least one processor, and a computer program that is stored in the memory and operable on the at least one processor, wherein the at least one processor is configured to acquire sensor data collected by a preset sensor;

establish a pose constraint relationship of a movable object and a semantic constraint relationship of a semantic object according to the sensor data;

perform a joint optimization solution according to the pose constraint relationship and the semantic constraint relationship to determine a semantic result of the semantic object and a pose result of the movable object; and construct a semantic map and a point cloud map according to the semantic result and the pose result;

wherein the sensor data comprises an image collected by an image collection apparatus and a point cloud collected by a point cloud collection apparatus, and the establishing the semantic constraint relationship of the semantic object according to the sensor data comprises:

determining an observed value of a 3D profile corresponding to each semantic object according to the image and the point cloud; and establishing the semantic constraint relationship based on the observed value of the 3D profile.

12. The computer device according to claim 11, wherein the preset sensor comprises one or more of a global navigation satellite system GNSS, an inertial measurement unit IMU, a wheel speedometer, the image collection apparatus and the point cloud collection apparatus, wherein the IMU comprises an accelerator and a gyroscope; and the pose constraint relationship comprises one or more of:

a global pose constraint relationship, an IMU pre-integration constraint relationship, a velocity constraint relationship and a point cloud registration constraint relationship.

13. The computer device according to claim 12, wherein in a case that the pose constraint relationship comprises the global pose constraint relationship, the processor is further configured to establish a global semantic constraint relationship of the movable object according to the sensor data, comprising:

estimating a current pose at a current time according to a pose at a previous time and a pose variation corresponding to the previous time to the current time, wherein the pose variation is obtained by IMU integration; and establishing, if a difference between the estimated current pose and an observed pose value is less than a preset gap threshold, the global pose constraint relationship corresponding to the current time according to a state variable of the pose and the observed pose value; or discarding the global pose constraint relationship corresponding to the current time.

14. The computer device according to claim 12, wherein the at least one processor is further configured to:

construct a joint optimization objective function corresponding to respective keyframes in a preset sliding window according to the pose constraint relationship and the semantic constraint relationship; and solve the joint optimization objective function to obtain estimated values of a respective state variables, wherein the estimated value of the state variable of the semantic object is recorded as the semantic result, and the estimated values of a position state variable and an attitude state variable are recorded as the pose result.

15. The computer device according to claim 14, wherein the at least one processor is further configured to:

calculate corner points of the semantic object according to the semantic result and a geometrical relationship;

perform connection processing on the respective corner points to obtain the 3D profile of the semantic object;

synthesize the 3D profile of the respective semantic object to obtain a semantic map of the semantic object; and superimpose the point clouds according to the pose result to obtain the point cloud map, wherein for a dashed lane line, the 3D profile corresponds to a sequential connection line of four corner points of a space rectangle; and for a solid lane line, the 3D profile corresponds to two edge lines obtained by sequentially connecting the corner points along a length direction in a spatial order.

16. A non-transitory computer-readable storage medium configured to store a computer program therein, wherein the program, when being executed by a processor, following steps are performed:
    acquiring sensor data collected by a preset sensor;
    establishing a pose constraint relationship of a movable object and a semantic constraint relationship of a semantic object according to the sensor data;
    performing a joint optimization solution according to the pose constraint relationship and the semantic constraint relationship to determine a semantic result of the semantic object and a pose result of the movable object; and
    constructing a semantic map and a point cloud map according to the semantic result and the pose result;
    wherein the sensor data comprises an image collected by an image collection apparatus and a point cloud collected by a point cloud collection apparatus, and the step of establishing the semantic constraint relationship of the semantic object according to the sensor data comprises:
    determining an observed value of a 3D profile corresponding to each semantic object according to the image and the point cloud; and
    establishing the semantic constraint relationship based on the observed value of the 3D profile.

17. The computer-readable storage medium according to claim 16, wherein the preset sensor comprises one or more of a global navigation satellite system GNSS, an inertial measurement unit IMU, a wheel speedometer, the image collection apparatus and the point cloud collection apparatus, wherein the IMU comprises an accelerator and a gyroscope; and
    the pose constraint relationship comprises one or more of the followings:
        a global pose constraint relationship, an IMU pre-integration constraint relationship, a velocity constraint relationship and a point cloud registration constraint relationship,
        where the step of performing the joint optimization solution according to the pose constraint relationship and the semantic constraint relationship to determine the semantic result of the semantic object and the pose result of the movable object comprises:
            constructing a joint optimization objective function corresponding to respective keyframes in a preset sliding window according to a pose constraint relationship and a semantic constraint relationship; and
            solving the joint optimization objective function to obtain estimated values of respective state variables, wherein the estimated value of the state variable of the semantic object is recorded as the semantic result, and the estimated values of a position state variable and an attitude state variable are recorded as the pose result.

18. The computer-readable storage medium according to claim 17, wherein the point cloud registration constraint is obtained by:
    dividing, for the point cloud of the respective keyframes in the preset sliding window, respective points into line feature points and plane feature points according to curvature information of the points in the point cloud;
    superimposing, for each current keyframe in the preset sliding window, a pose of a previous keyframe and an inter-frame pose variation obtained by IMU integration to obtain an initial registration pose corresponding to the current keyframe;
    performing nearest neighbor search for the line feature points and the plane feature points in a local map according to the initial registration pose respectively to obtain a corresponding nearest neighbor feature point set, wherein the local map comprises the feature points of the respective keyframes in the preset sliding window;
    establishing 0 a line error function and the plane error function respectively according to the corresponding nearest neighbor feature point set; and
    determining the point cloud registration constraint according to the respective line error functions and plane error functions in the preset sliding window.

19. The computer-readable storage medium according to claim 18, wherein
    the step of establishing the line error function according to the corresponding nearest neighbor feature point set corresponding to the line feature points comprises:
        performing straight-line fitting according to the nearest neighbor feature point set corresponding to the line feature points, and determining the line error function according to a distance from each line feature point to a corresponding fitting straight line; and
    the step of establishing the plane error function according to the corresponding nearest neighbor feature point set corresponding to the plane feature points comprises:
        performing plane fitting according to the nearest neighbor feature point set corresponding to the plane feature points, and determining the plane error function according to a distance from each plane feature point to a corresponding fitting plane.

* * * * *